US011720073B2

(12) United States Patent
Akhlaghi et al.

(10) Patent No.: US 11,720,073 B2
(45) Date of Patent: Aug. 8, 2023

(54) SMART ELECTRICAL OUTLET FOR MONITORING AND TRACKING ELECTRICITY USAGE

(71) Applicant: Parkizio Technologies Ltd., Richmond (CA)

(72) Inventors: Mohammad Akhlaghi, Coquitlam (CA); Ali Reza Mohazab, Vancouver (CA); Douglas Sim, Vancouver (CA); Etienne Naugle, New Westminster (CA)

(73) Assignee: Parkizio Technologies Ltd., Richmond (CA)

( * ) Notice: Subject to any disclaimer, the term of this patent is extended or adjusted under 35 U.S.C. 154(b) by 240 days.

(21) Appl. No.: 17/014,838

(22) Filed: Sep. 8, 2020

(65) Prior Publication Data

US 2021/0072714 A1    Mar. 11, 2021

Related U.S. Application Data

(60) Provisional application No. 62/896,749, filed on Sep. 6, 2019.

(51) Int. Cl.
*G05B 19/042* (2006.01)
*G06F 21/31* (2013.01)
*H02J 7/00* (2006.01)
*H02J 13/00* (2006.01)

(52) U.S. Cl.
CPC ........... *G05B 19/042* (2013.01); *G06F 21/31* (2013.01); *H02J 7/0013* (2013.01); *H02J 13/00001* (2020.01); *H02J 13/00002* (2020.01); *H02J 13/0005* (2020.01); *H02J 13/00022* (2020.01); *H02J 13/00036* (2020.01); *G05B 2219/2639* (2013.01)

(58) Field of Classification Search
CPC ....................................... G06F 21/31
USPC ....................................... 700/295
See application file for complete search history.

(56) References Cited

U.S. PATENT DOCUMENTS

| | | | |
|---|---|---|---|
| 7,917,251 B2 | 3/2011 | Kressner et al. |
| 7,956,570 B2 | 6/2011 | Lowenthal et al. |
| 8,138,715 B2 | 3/2012 | Lowenthal et al. |
| 8,170,699 B2 | 5/2012 | Kressner et al. |
| 8,290,649 B2 | 10/2012 | Iwashita et al. |
| 8,359,126 B2 | 1/2013 | Tate, Jr. et al. |

(Continued)

*Primary Examiner* — Md Azad
(74) *Attorney, Agent, or Firm* — Oyen Wiggs Green & Mutala LLP

(57) ABSTRACT

A system tracks and controls access for supplying electrical power for charging devices associated with a user. The system has a server and one or more outlets. The outlets are connected to electrical power and are configured to supply electrical power to the devices. Each of the outlets has a socket configured to supply electrical power to the devices. Each of the outlets is further configured to transmit the credentials to the server for authorization to access the outlet. The server is configured to determine whether the user is authorized to access the outlet and to transmit authorization to the outlet. The outlet is further configured to start a session and provide electrical power to the one or more devices upon receiving authorization from the server. The outlet is further configured to transmit information regarding the parameters to the server during the session.

20 Claims, 8 Drawing Sheets

(56) References Cited

U.S. PATENT DOCUMENTS

| | | |
|---|---|---|
| 8,374,729 B2 | 2/2013 | Chapel et al. |
| 8,450,967 B2 | 5/2013 | Lowenthal et al. |
| 8,564,403 B2 | 10/2013 | Landau-Holdsworth et al. |
| 8,583,551 B2 | 11/2013 | Littrell et al. |
| 8,624,719 B2 | 1/2014 | Klose et al. |
| 8,683,236 B2 | 3/2014 | Ukita et al. |
| 8,706,312 B2 | 4/2014 | Littrell et al. |
| 8,736,225 B2 | 5/2014 | Chen et al. |
| 8,836,281 B2 | 9/2014 | Ambrosio et al. |
| 8,918,336 B2 | 12/2014 | Ferro et al. |
| 9,013,283 B1 | 4/2015 | Tackaberry |
| 9,085,241 B2 | 7/2015 | Asano et al. |
| 9,597,974 B2 | 3/2017 | Lowenthal et al. |
| 9,677,907 B2 | 6/2017 | Knuth et al. |
| 9,688,155 B2 | 6/2017 | Marlin et al. |
| 9,718,370 B2 | 8/2017 | Penilla et al. |
| 9,785,213 B2 | 10/2017 | Dent et al. |
| 9,802,500 B1 | 10/2017 | Penilla et al. |
| 9,804,210 B2 | 10/2017 | Haebler et al. |
| 9,853,488 B2 | 12/2017 | Fincham et al. |
| 9,878,629 B2 | 1/2018 | Lowenthal et al. |
| 9,912,152 B2 | 3/2018 | Raneri et al. |
| 9,952,611 B2 * | 4/2018 | Forbes, Jr. ............... H02J 3/00 |
| 9,958,925 B2 | 5/2018 | Chapel et al. |
| 9,989,982 B2 | 6/2018 | Forbes, Jr. |
| 10,050,441 B2 | 8/2018 | Chapel et al. |
| 10,185,978 B2 | 1/2019 | Khoo et al. |
| 10,309,800 B2 | 6/2019 | Knuth et al. |
| 10,338,113 B2 | 7/2019 | Haebler et al. |
| 10,355,482 B2 | 7/2019 | Raneri et al. |
| 2007/0155349 A1 * | 7/2007 | Nelson ................... H04L 12/00 |
| | | 455/128 |
| 2014/0006506 A1 * | 1/2014 | Frei ......................... H04L 67/55 |
| | | 700/297 |
| 2016/0380440 A1 * | 12/2016 | Coleman, Jr. ........ H02J 7/00711 |
| | | 700/295 |
| 2017/0133843 A1 * | 5/2017 | McNeill-McCallum .................... |
| | | H02J 3/0075 |
| 2017/0280109 A1 * | 9/2017 | Scalisi ............... H04N 5/23238 |
| 2020/0051185 A1 * | 2/2020 | Collins ................ G06K 7/10366 |
| 2021/0080282 A1 * | 3/2021 | Goei ........................ B60L 53/64 |

* cited by examiner

SMART ELECTRICAL OUTLET FOR MONITORING AND TRACKING ELECTRICITY USAGE

CROSS-REFERENCE TO RELATED APPLICATIONS

This application claims the benefit of U.S. Provisional Patent Application No. 62/896,749 filed Sep. 6, 2019, the contents of which are hereby incorporated by reference.

FIELD OF THE INVENTION

The invention relates to electrical outlets, and in particular, to smart electrical outlets for monitoring and tracking electricity usage.

BACKGROUND OF THE INVENTION

Many modern devices (e.g. telephones, computers, vehicles, etc.) are powered by batteries, and those batteries require electrical charging from time to time. Typically, this electrical charging may be done by plugging the device into a socket of an electrical outlet.

However, it is desirable to monitor and track the usage of electricity through an outlet. In particular, it is desirable to monitor and track the usage of electricity so that appropriate payment may be received for the electrical usage.

These and other objects will be better understood by reference to this application as a whole. Not all of the objects are necessarily met by all embodiments of the invention described below.

SUMMARY OF THE INVENTION

In one embodiment of the invention, a system tracks and controls access for supplying electrical power for charging one or more devices associated with a user. The system comprises a server and one or more outlets. The outlets are connected to electrical power and are configured to supply electrical power to the one or more devices. Each of the one or more outlets comprises a socket, a control module, a measurement module, and an identification module. The socket is configured to supply electrical power to the one or more devices. The control module engages and disengages electrical power to the socket. The measurement module measures one or more parameters of electrical power supplied to the one or more devices by the socket. The identification module reads credentials for the user. Each of the one or more outlets is further configured to transmit the credentials to the server for authorization to access the outlet. The server is configured to determine whether the user is authorized to access the outlet and to transmit authorization to the outlet. The outlet is further configured to start a session and provide electrical power to the one or more devices upon receiving authorization from the server. The outlet is further configured to transmit information regarding the one or more parameters to the server during the session.

In yet another embodiment, the system further comprises one or more access units configured to store the credentials.

In still yet another embodiment, the identification module comprises one or more readers. The access units and the readers are adapted to communicate wirelessly with each other.

In a further embodiment, the access units and the readers have near-field communications capabilities.

In still a further embodiment, the control module comprises one or more relays.

In another embodiment, the measurement module comprises one or more gauges. The one or more gauges are configured to measure one or more of the parameters, the parameters being one or more of current, voltage, or power.

In still another embodiment, each of the one or more outlets further comprises a communications module for communicating with the server.

In still yet another embodiment, the communications module comprises one or more transceivers.

In a further embodiment, each of the one or more outlets further comprises a notification module to displaying a status of the outlet to the user.

In still a further embodiment, the notification module comprises one or more lights.

In still yet a further embodiment, the system further comprises a database in communications with the server. The database comprises one or more access plans associated with the user, with the access plans comprising information defining one or more rates for electrical power consumption and one or more rules for access to the outlet.

In another embodiment, the server is further configured to determine a cost for the session, with the cost determined based on, at least in part, the one or more access plans associated with the user and the parameters during the session.

In yet another, the database further comprises one or more digital wallets. At least one of the digital wallets is associated with the user, the digital wallet comprising information regarding funds associated with the user.

In still yet another embodiment, the server is further configured to debit the cost for the session from the digital wallet associated with the user.

In a further embodiment, at least one of the digital wallets is associated with a third party, and the server is further configured to credit the cost for the session to the digital wallet associated with the third party.

In still a further embodiment, the server is further configured to communicate with one or more utility companies to receiving information regarding electrical rates, with the cost for the session being determined based on, at least in part, the information regarding electrical rates.

In still yet a further embodiment, the server is further configured to communicate with a payment handler. Information regarding the cost for the session is transmitted to the payment handler to arrange for payment.

In another embodiment, a system tracks and controls access for supplying electrical power for charging one or more devices associated with a user. The system comprises a server, one or more outlets, and one or more computing devices associated with the user. The one or more outlets is connected to electrical power and configured to supply electrical power to the one or more devices. Each of the one or more outlets comprises a socket, a control module, a measurement module, and an identification module. The socket is configured to supply electrical power to the one or more devices. The control module engages and disengages electrical power to the socket. The measurement module measures one or more parameters of electrical power supplied to the one or more devices by the socket. The identification code is located on the outlet, with the identification code being unique to each of the one or more outlets. The computing devices are configured to connect to the server and to allow transmission to the server the identification code and identification of the user. The server is configured to determine whether the user is authorized to access the outlet and to transmit authorization to the outlet. The outlet is further configured to start a session and provide electrical power to the one or more devices upon receiving authorization from the server. The outlet is further configured to transmit information regarding the one or more parameters to the server during the session.

In another embodiment, the identification code comprises one or both of a QR code and an alphanumerical identifier.

In a further embodiment, the server is further configured to generate a user interface for display on the computing devices, with the user interface configured to allow the user to enter information regarding the identification code and the identification of the user.

The foregoing was intended as a summary only and of only some of the aspects of the invention. It was not intended to define the limits or requirements of the invention. Other aspects of the invention will be appreciated by reference to the detailed description of the embodiments.

BRIEF DESCRIPTION OF THE DRAWINGS

The preferred embodiment of the invention will be described by reference to the drawings thereof, in which.

DETAILED DESCRIPTION

Figure 1:
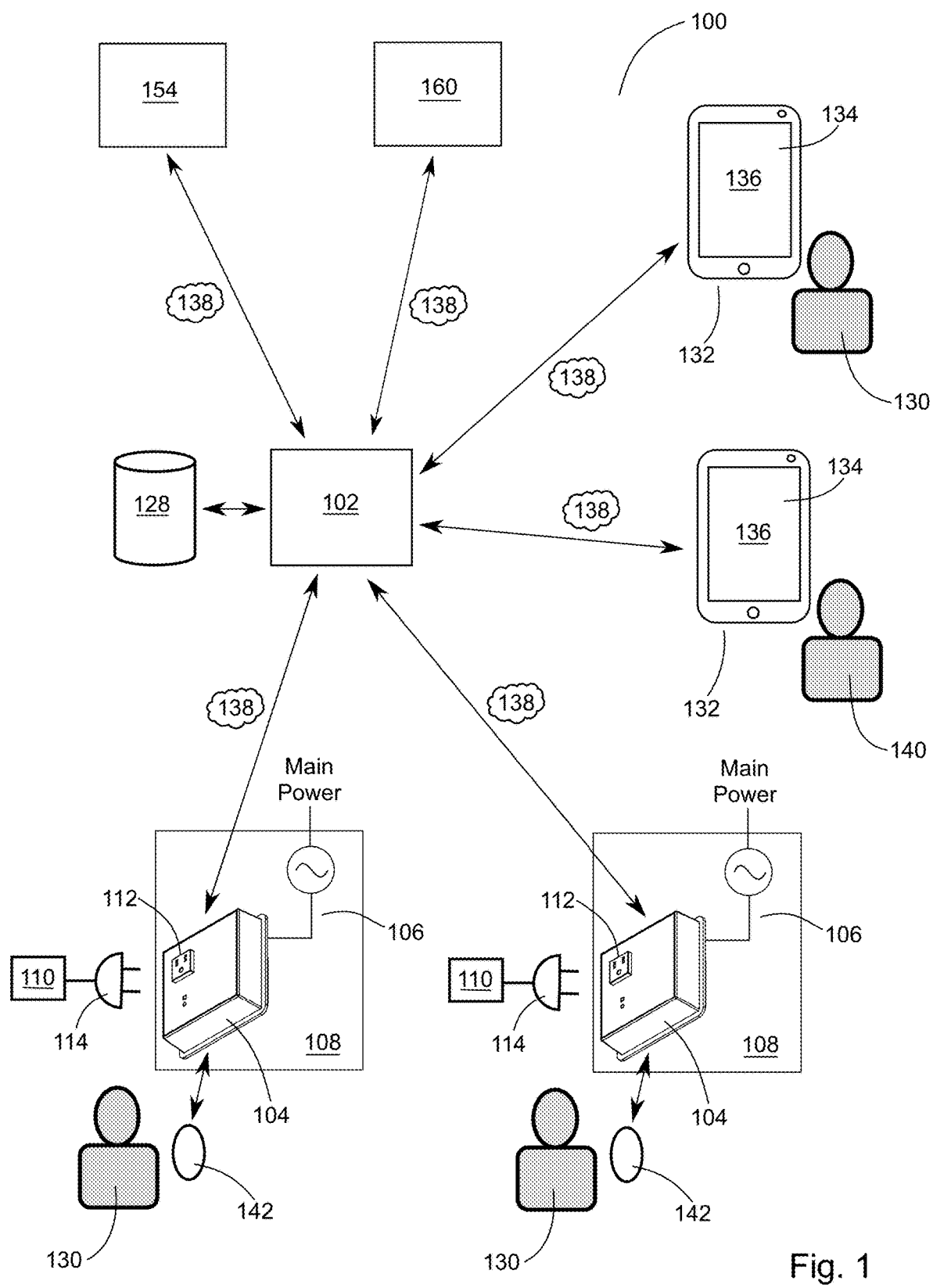
FIG. 1 depicts the system in accordance with an embodiment of the invention.

Referring to FIG. 1, a system 100 in accordance with an embodiment of the invention comprises a server 102 and one or more electrical outlets 104. The electrical outlets 104 are preferably electrically connected to electrical wiring 106 for one or a number of buildings 108 and are configured to supply electrical power to charge one or more devices 110. The devices 110 may be anything that is able to accept electrical power, including, but not limited to, electrical vehicles, mobile devices, computers, smartphones, etc. Each of the electrical outlets 104 comprises an electrical socket 112 adapted to receive an electrical plug 114 of the device 110. The socket 112 may be one of the standard NEMA (National Electrical Manufacturers Association) receptacle or some other receptacle that is adapted to receive the plug 114. The outlets 104 may be located at disparate locations throughout a geographical area.

Figure 2:
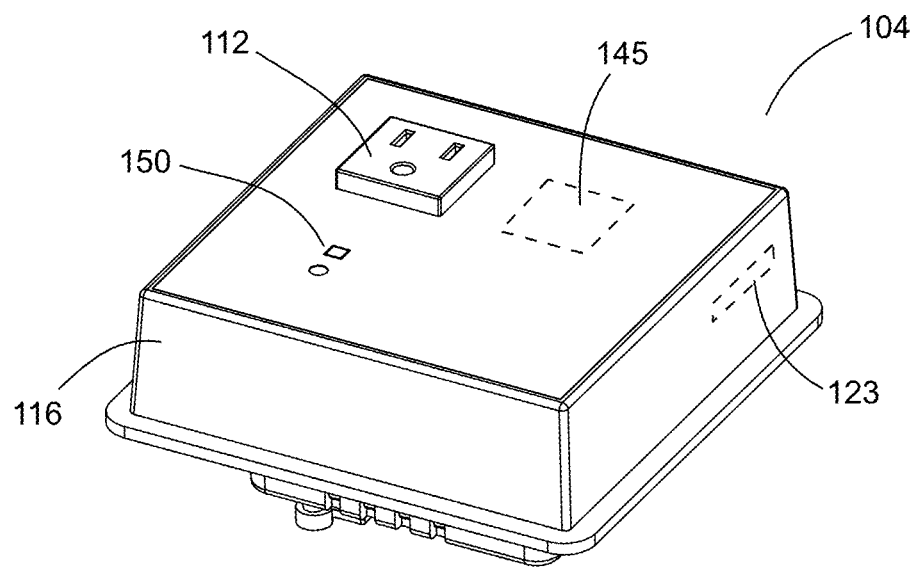
FIG. 2 is a perspective view of the outlet of the system of FIG. 1.
Figure 3:
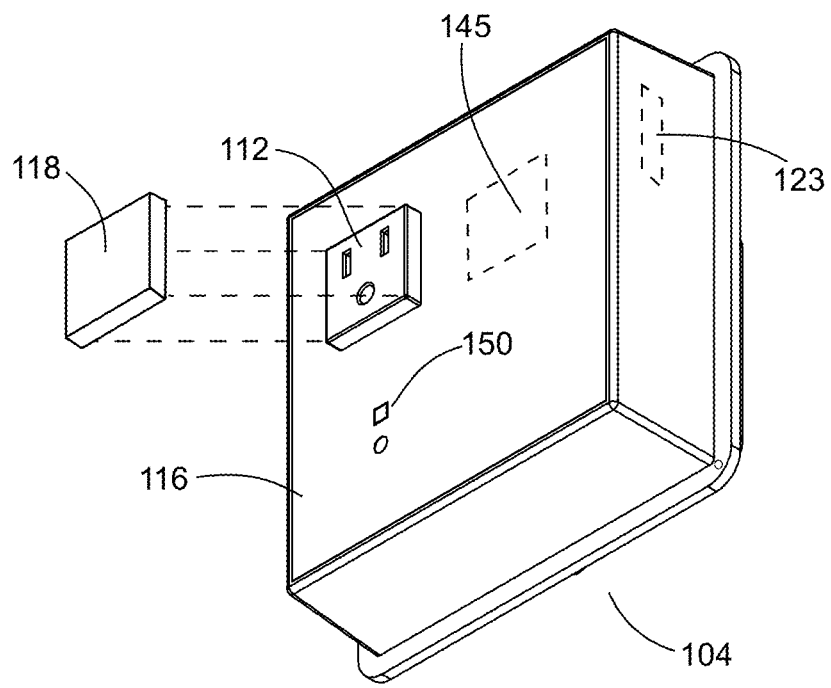
FIG. 3 is another perspective view of the outlet of FIG. 2.

Referring to FIGS. 2 and 3, the outlet 104 preferably comprises an outer casing 116 that encloses at least some of the components of the outlet 104. The casing 116 provides protection for the components from damage and/or tampering. The socket 112 may be located on the exterior of the casing 116, so as to be accessible. Alternatively, the socket 112 may be covered by a removable covering 118, so as to be accessible only when needed.

Figure 4:
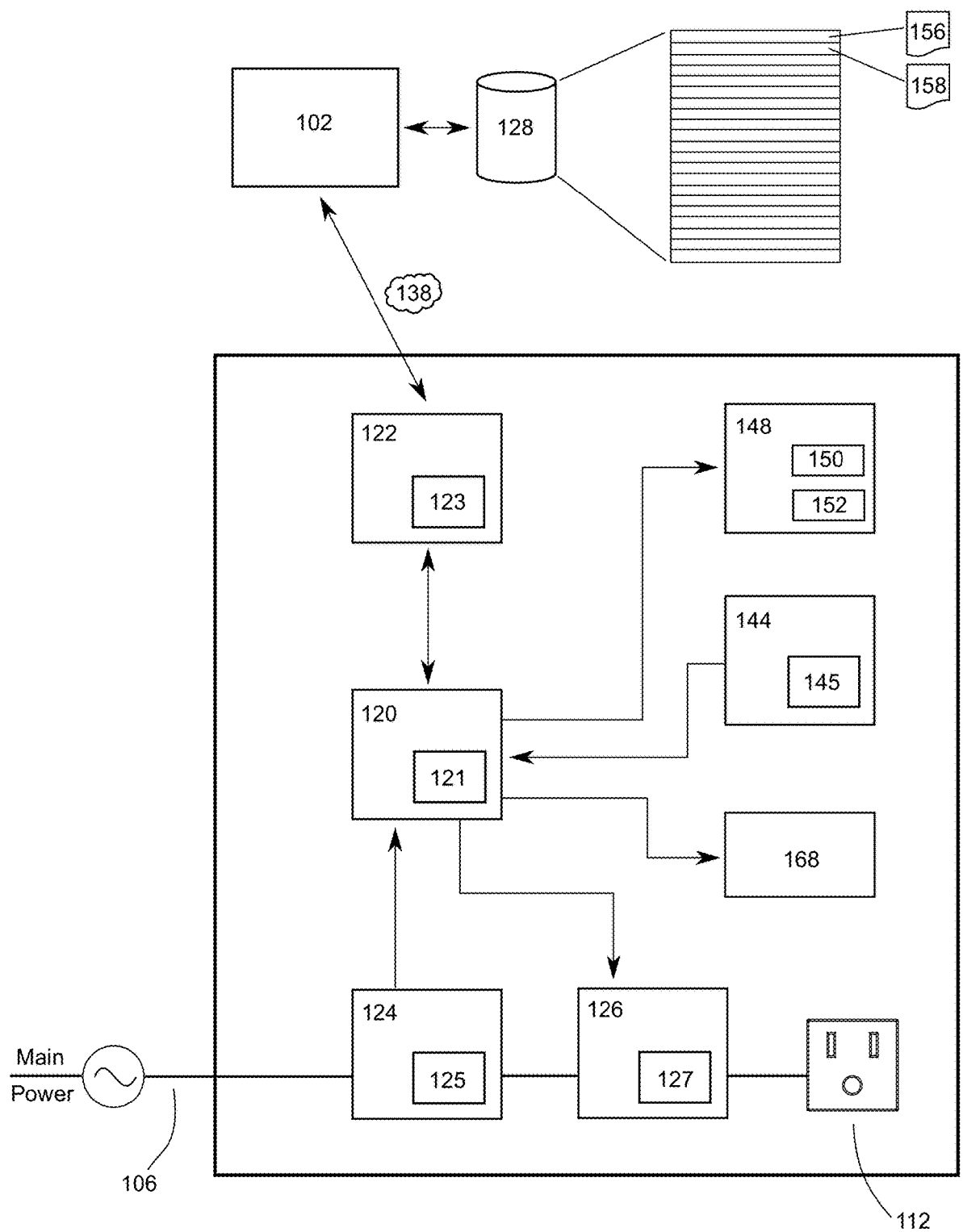
FIG. 4 is a block diagram showing the components of the outlet and the system in accordance with one embodiment of the invention.

FIG. 4 depicts some of the components in the outlet 104. The outlet 104 further comprises a processing module 120 and a communications module 122. The processing module 120 may comprise one or more processors 121, while the communications module 122 may comprise one or more transceivers 123 (or the like) for communicating with the server 102 over one or more networks 138. The network 138 may be a closed network (e.g. a private network) or an open network (e.g. the Internet). The communications module 122 may communicate directly with the server 102 using one or more communications protocols, such as (but not limited to) Wi-Fi, cellular networking, Bluetooth, ZigBee, Ethernet, mesh networking (e.g. ad-hoc Wi-Fi, Bluetooth Low Energy, etc.), or the like. Alternatively, the communications module 122 may communicate with the server 102 through proxying via other ones of the communications modules 122 on other ones of the outlets 104, as shown in FIG. 5.

Figure 5:
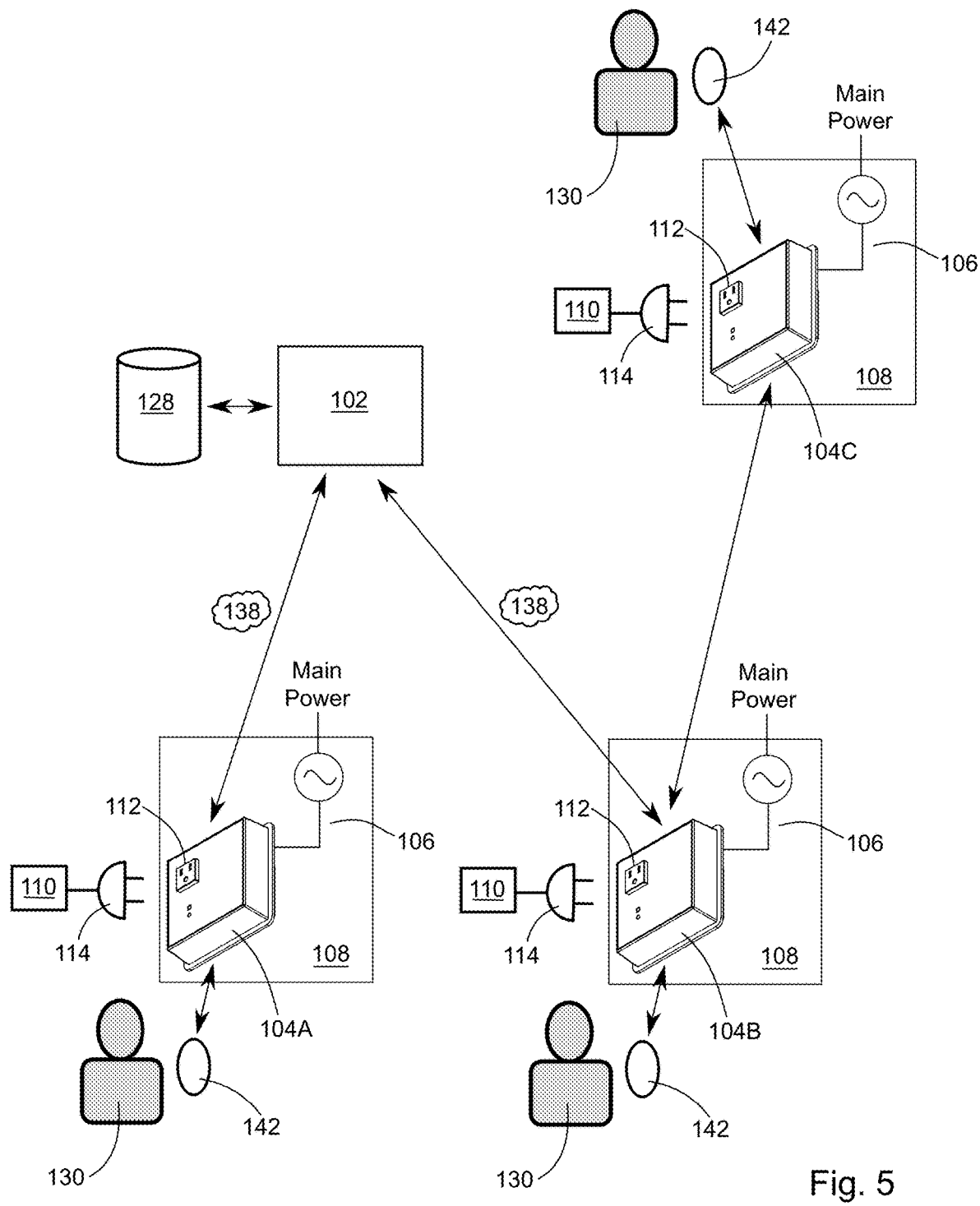
FIG. 5 depicts the different methods of communications between the outlets and the server.

Referring to FIG. 5, the outlets 104A and 104B are in wireless communications with the server 102 through the network 138 (as described above). However, the outlet 104C is not in direct communications with the server 102 but is still able to communicate with the server 102 through a connection via the outlet 104B. This allows for communications between the outlets 104 and the server 102 even when some of the outlets 104 may not be able to establish a direct communications link with the server 102 (e.g. because of physical barriers or other limitations).

Referring back to FIG. 4, the outlet 104 further comprises a measurement module 124 for measuring the amount of electrical power supplied by the outlet 104. In order to do so, the measurement module 124 may comprise one or more gauges 125 adapted to measure one or more of the characteristics of current, voltage, and/or power. The data from the measurement module 124 may be transmitted to the processing module 120. For example, the processing module 120 is able to determine total electrical consumption by using instantaneous values of current and voltage detected by the gauges 125 and polling.

In addition, the outlet 104 comprises a control module 126 that is adapted to control the flow of electrical power to the socket 112. For example, the control module 126 may comprise one or more relays 127 that are configured to either permit or stop the flow of electrical power from the wiring 106 to the socket 112. The operation of the control module 126 (e.g. the control of the relays 127) may be effected by commands from the processing module 120.

The server 102 may also access a database 128 for storing and retrieving data regarding the system 100.

The processing module 120 may be configured to periodically update the server 102 with the status of the outlet 104 (through communications using the communications module 122), including the current values of the current and voltage used and the total electrical consumption since a particular reference time.

Furthermore, the processing module 120 may be configured to receive instructions from the server 102 (through the communications module 122) to control the flow of electrical power through the socket 112. For example, this may take the form of instructions to the processing module 120 to cause the relay 127 to stop or start the flow of electrical power to the socket 112.

In addition to control remotely by the server 102, the processing module 120 may also control (at a local level) the flow of electrical power through the socket 112. For example, in one scenario, the processing module 120 may be configured to cause the flow of electrical power through the socket 112 to cease if the current drawn by the socket 112 is detected by the measurement module 124 to be zero for a predetermined period of time (e.g. for one second or greater). Shutting the flow of electrical power upon the zeroing of the current for a predetermined period of time may be helpful in preventing users 130 from quickly swapping one of the devices 110 for another one of the devices 110 in midsession (e.g. unplugging the device 110 of a first user 130 that is currently connected to the socket 112 and plugging in another device 110 of a second user 130 to the socket 112, thereby depriving the first user 130 of the allotted electrical power).

While the shutdown of electrical power upon the detection of zero current in midsession is useful to prevent unauthorized users 130 from accessing electrical power, it may cause issues when an authorized user 130 is starting a session. For example, the user 130 may first enable the outlet 104 and then plug in the device 110 into the socket 112. However, the shut-off mechanism described above will prevent the user 130 from accessing electrical power. This is because as soon as the user 130 enables the outlet 104, since there is nothing plugged in and the drawn current is zero, the processing module 120 will cause the outlet 104 to shut down, not giving the user 130 the chance to draw any electrical power. Therefore, in another embodiment, the processing module 120 may be configured to implement a grace period at the beginning of the session (e.g. 20 seconds). In this embodiment, upon enabling the outlet 104, the user 130 has a grace period to plug the device 110 into the socket 112 and still be able to access electrical power. If the current drawn is detected by the measurement module 124 to be still zero after the grace period has expired, the outlet 104 will still shut down. Once current has been detected by the measurement module 124 to have been drawn, any subsequent zeroing of the current will shut the flow of electrical power after the predetermined period of time (e.g. one second).

Referring back to FIG. 1, in one embodiment, the server 102 may be in communications with one or more computing devices 132. The computing devices 132 may include devices such as computers, smartphones, tablets, or the like. The computing devices 132 preferably comprises a display 134 that may be configured to display a user interface 136. The communications between the computing devices 132 and the server 102 may be over the same one of the networks 138 used between the outlets 104 and the server 102, or they may be over a different one of the networks 138.

The computing devices 132 may be used by the users 130 or by managers 140. The users 132 may include individuals who would like to obtain electrical power through the outlets 104. The managers 140 may include administrators for the system 100 or may include property owners who have installed one or more of the outlets 104 on their property and wish to be compensated by the users 130 for the electrical consumption used by the users 130.

The users 130 and the managers 140 would be able to communicate with the server 102 through the computing devices 132 by first registering with the server 102. The registration process may require that each of the users 130 and managers 140 create appropriate usernames and/or passwords to allow access to the system 100. The server 102 may store data regarding the users 130 and the managers 140 in the database 128. The users 130 and the managers 140 will have different levels of access to the system 100. For example, the users 130 may only be allowed to access data or make changes regarding their own respective accounts, while the managers 140 may be allowed to access data or make global changes affecting multiple ones of the users 130 and/or multiple ones of the outlets 104.

In one embodiment, for example, either one of the users 130 or the managers 140 may set a floor current. This may be done by the user 130 or the manager 140 using the user interface 136 on the respective computing devices 132. By doing so, the user 130 or the manager 140 can set a threshold for the current drawn, such that if during the session, the drawn current (as detected by the measurement module 124) falls below the threshold, the flow of electrical power is stopped (using the control module 126), and the session is ended. This is helpful in situations where, for example, during electrical vehicle charging, even after charging has been completed, there may still be some small residual current drawn to power the lights of the charger. In such a situation, the processing module 120 is able to determine that the current drawn is lower than the threshold set by the user 130 or the manger 140 and will therefore cause the flow of electrical power to stop.

The system 100 may further comprise one or more access units 142 that are configured to interact with the outlets 104. The access units 142 may be a fob, a card with near-field communication (NFC) capabilities, or a mobile device. In one embodiment, the access unit 142 may be the same as the computing device 132. Preferably, each of the users 130 would be associated with one of the access units 142. The access units 142 would contain electronic storage of the credentials for the user 130 associated thereto such that when the user 130 uses the access unit 142 with the outlet 104, the user 130 is recognized by the system 100.

In order to do so, the outlet 104 may comprise an identification module 144 that is configured to interact with the access units 142. The identification module 144 may comprise one or more readers 145 that are preferably located on the casing 116. For example, the readers 145 may be a fob reader or have NFC capabilities. The readers 145 are configured to read the credentials stored on the access unit 142. Once the credentials are accessed by the readers 145, the information is sent to the processing module 120, which may then cause the communications module 122 to transmit the information to the server 102. The server 102, based on data in the database 128, is able to match the credentials to the appropriate one of the users 130 and to authorize access to the system 100. This authorization (and any other information regarding the user 130) can then be transmitted to the outlet 104.

Figure 6:
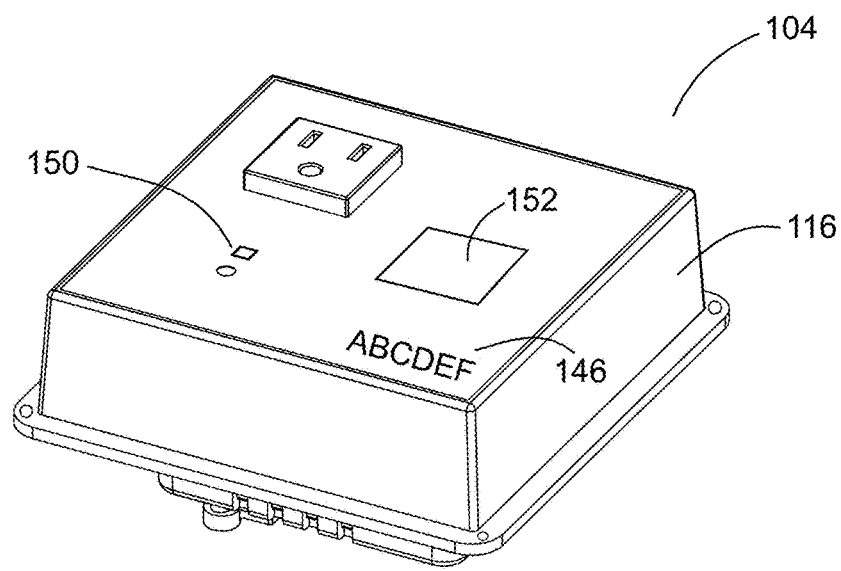
FIG. 6 is a perspective view of another embodiment of the outlet.
Figure 7:
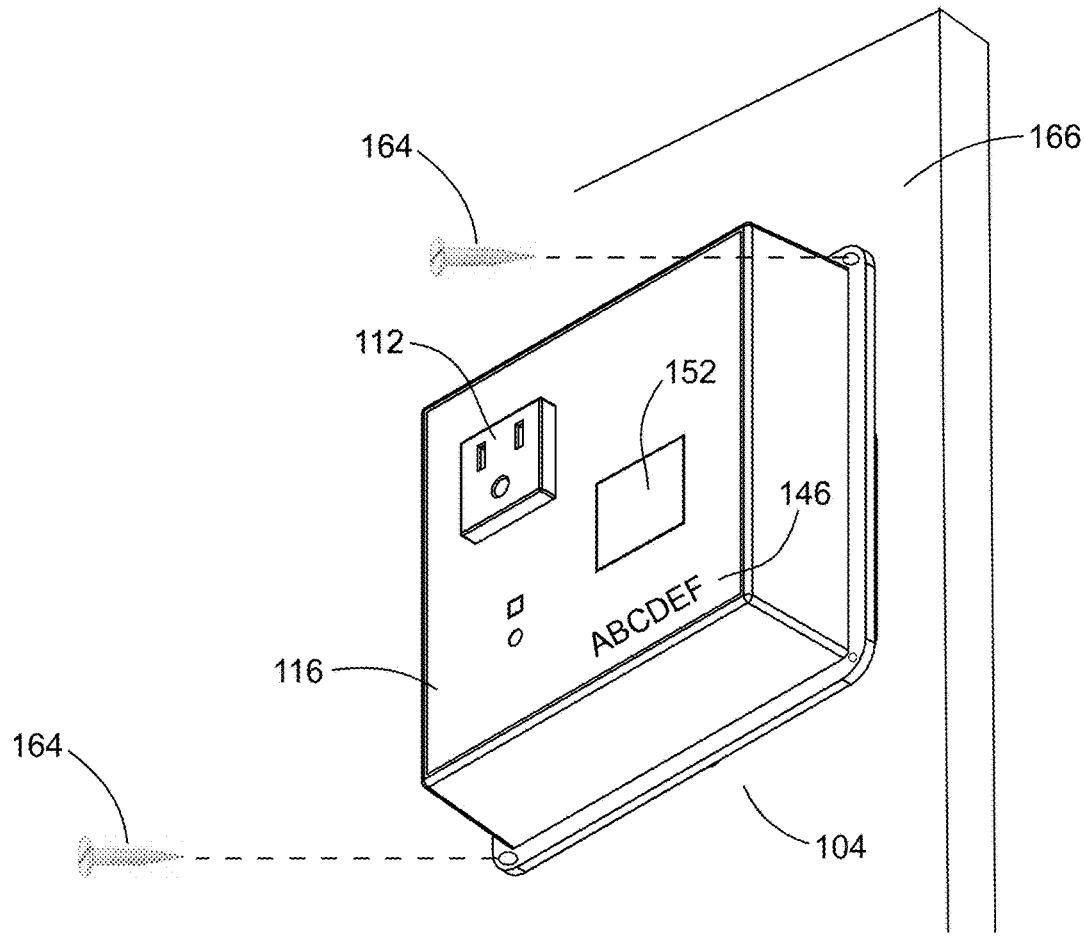
FIG. 7 is another perspective view of an embodiment of the outlet.
Figure 8:
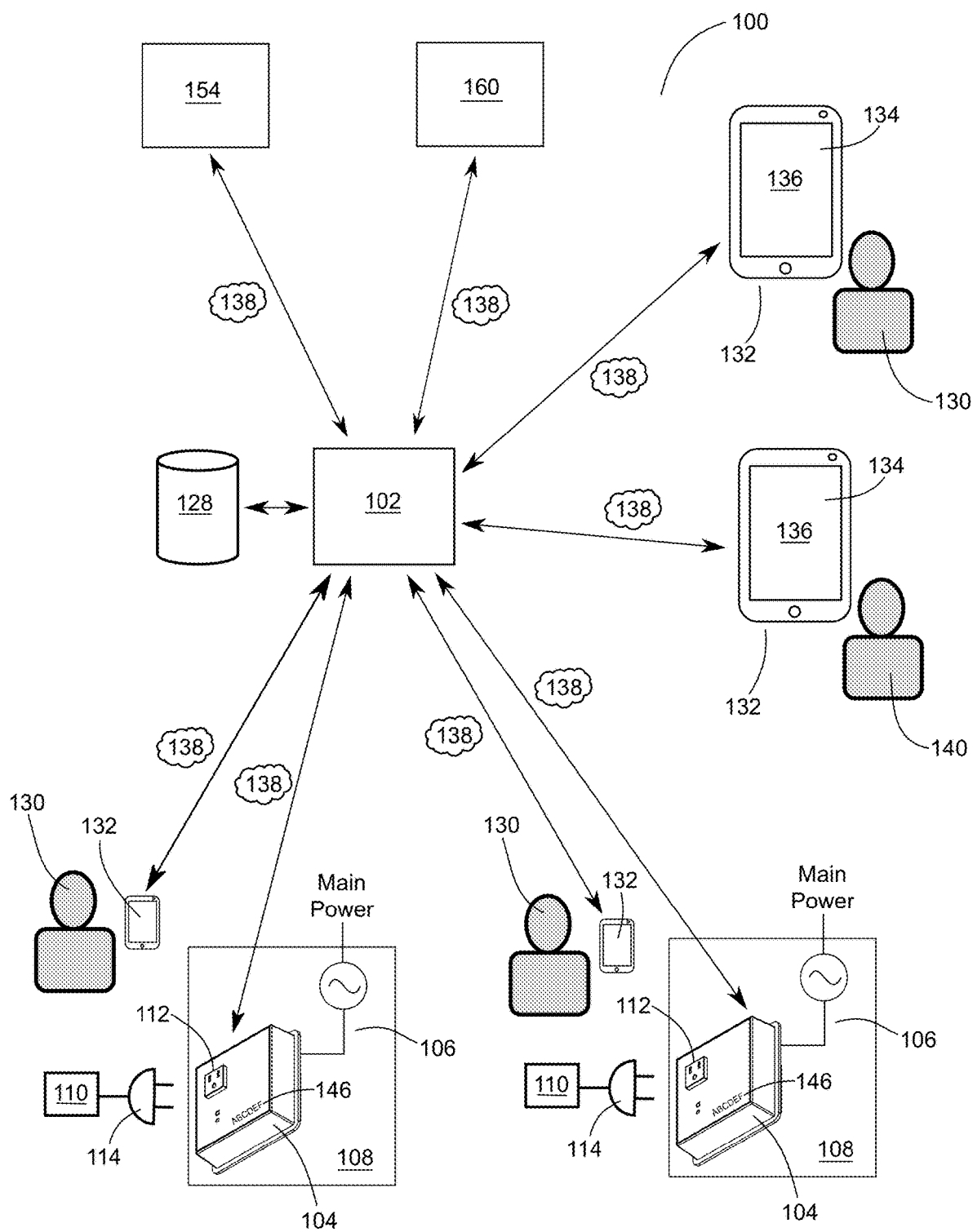
FIG. 8 depicts another embodiment of the system.

Referring to FIGS. 6 and 7, in other embodiments, the outlet 104 may also comprise an identification code 146. The identification code 146 may be a unique alphanumerical identifier (as shown in FIGS. 6 and 7) or it may be a QR code or some other identifier. The identification code 146 is preferably displayed on the casing 116. Referring to FIG. 8, the user 130 is able to use the computing device 132 and to enter the identification code 146 of the outlet 104 that the user 130 wishes to access through the user interface 136. Preferably, the identification code 146 for each of the outlets 104 is unique. In this manner, the server 102 is able to determine which one of the outlets 104 that the user 130 wishes to access and can transmit the authorization (and any other information regarding the user 130) to the particular one of the outlets 104. The user 130 therefore does not need to be physically present at the outlet 104 in order to access it.

Referring back to FIG. 4, the outlet 104 may also comprise a notification module 148 for displaying information to the user 130 about the outlet 104. For example, the notification module 148 may comprise one or more lights 150 located on the casing 116 (as shown in FIGS. 2 and 3). The lights 150 may employ different colors and/or sequences to convey various status messages to the user 130. Alternatively, or in addition, the notification module 148 may comprise a screen 152 located on the casing 116 for displaying messages to the user 130 (as shown in FIGS. 6 and 7).

The operation of the system 100 will now be described.

In one embodiment, each of the users 130 may use their respective computing devices 132 to connect to the server 102 over the network 138. This may be done using a web interface generated by the server 102 and displayed as the user interface 136 on the display 134. In another embodiment, the web interface may be replaced with a native mobile application that is run on the computing devices 132, with the application configured to communicate with the server 102 via web protocols. The users 130 are able to register with the system 100, and information regarding the users 130 (e.g. usernames, passwords, credentials, etc.) may be stored by the server 102 in the database 128.

Similarly, the managers 140 may also use their respective computing devices 132 to connect to the server 102 over the network 138. The managers 140 are able to register with the system 100. In cases where one of the managers 140 have installed one or more of the outlets 104 on their property and wish to be compensated for their use, the server 102 is able to associate those particular one or more of the outlets 104 with the manager 140.

Through the user interface 136, the user 130 may be able to view and/or select one or more access plans 156 that defines parameters such as the level of access, the costs, and/or the payment methods for the user 130. In one embodiment, if the user 130 does not select one or more of the access plans 156, a default one of the access plans 156 may be assigned to the user 130.

The access plan 156 for the user 130 may, for example, indicate that the user 130 can only access the outlets 104 during specified working hours of specified days. For example, the access plan 156 may indicate that the user 130 cannot access the outlets 104 during the weekend. The access plan 156 may also indicate the rate that the user 130 has to pay to access one of the outlets 104. The access plan 156 may also indicate that the rate will differ depending on the time and day of access. Furthermore, the access plan 156 may indicate that there is an initial fee for access to one of the outlets 104 followed by a rate per duration of usage and/or a cost for each kilowatt-hour (kWh) of electrical power consumption. It will be appreciated that the access plan 156 may have many parameters.

In addition, the managers 140 may also assign one or more of the access plans 156 to one or more of the users 130. For example, the managers 140 may connect to the server 102 over the network 138 using their respective computing devices 132. The managers 140 may be able to interact with the server 102 through the user interface 136 on the display 134. The managers 140 are able to view the access plans 156 for one or more of the users 130 and are able to assign and/or define the access plans 156 for one or more of the users 130.

In addition, in another embodiment, the access plan 156 may include parameters that are dynamically set. For example, utility companies 154 may allow access (e.g. through HTTP requests) by others and provide information regarding the rate of electricity, as charged to customers at a particular instance in time. The server 102 is able to communicate with the utility companies 154 (e.g. through the network 138) to access the rate of electricity charged to customers at a certain time. In this embodiment, the access plan 156 may be linked by the server 102 to dynamically adjust the rate charged to the user 130 based, at least in part, on the rate of electricity, as charged by the utility company 154 at that particular time. For example, the access plan 156 may specify that the rate charged to the user 130 may be equal to the rate of electricity, as charged by the utility company 154 at that particular time, plus a certain percentage (e.g. 5%).

Furthermore, the access plan 156 may also specify that different ones of the outlets 104 may have different costs for access. For example, the outlets 104 located in certain geographical areas may have a higher cost for access than outlets 104 located in other areas. This, for example, may be reflected by a higher rate charged to the user 130.

The server 102 may also be configured to allow the users 130 to associate with one or more digital wallets 158 for storing and tracking money or credits to be used for payment in the system 100. The digital wallets 158 may be virtual accounts that the users 130 can replenish from time to time and from which payments can be applied, such as when the users 130 obtain electrical power from the outlets 104. Furthermore, the server 102 may also be configured to allow the managers 140 to associate with one or more of the digital wallets 158. For example, the digital wallets 158 for the managers 140 may be used to receive payment from the digital wallets 158 for the users 130. The server 102 may be configured to transfer funds between the digital wallets 158 for the users 130 and the managers 140.

Information regarding the access plan(s) 156 associated with each of the users 130 and information regarding the digital wallets 158 associated with each of the users 130 may be stored by the server 102 in the database 128. Information regarding the digital wallets 158 associated with the managers 140 may also be stored by the server 102 in the database 128.

In another embodiment, instead of (or in addition to) the use of the digital wallets 158 for storing and tracking funds, the server 102 may also communicate (e.g. through the network 138) to a third-party payment handler 160 (e.g. PayPal or the like). The server 102 may communicate with the payment handler 160 to transmit or receive funds. In addition, the server 102 may communicate with the payment handler 160 to provide instructions to the payment handler 160 regarding the transfer or payment of funds. For example, if the users 130 and the managers 140 have accounts managed by the payment handler 160, the server 102 may transmit instructions to the payment handler 160 to transfer funds from one account to another.

One or more of the users 130 may be provided with one of the access units 142. When the user 130 encounters one of the outlets 104 and wishes to have electrical power supplied by the outlet 104 to the device 110, the user 130 may place the access unit 142 in close proximity with the outlet 104. The identification module 144 for the outlet 104 is able to (using the reader 145) read the credentials for the user 130 stored on the access unit 142. This information may be sent to the processing module 120, which will in turn cause it to be transmitted by the communications module 122 to the server 102. In addition, the processing module 120 will cause an identifier to be sent to the server 102 to identify which one of the outlets 104 the user 130 is attempting to access. The server 102, based on information in the database 128, is able to authenticate the credentials for the user 130. The server 102 is also able to retrieve from the database 128 information regarding the digital wallet 158 for the user 130 and the access plan 156 applicable (which may depend on the current time, the user 130, and the outlet 104).

Depending on the access plan 156 that is applicable, the server 102 determines whether the digital wallet 158 for the user 130 contains funds meeting a particular minimum threshold and whether the user 130 is authorized to use the outlet 104 at that time. If both conditions are met, the server 102 will transit a message to the outlet 104 authorizing usage of the outlet 104. The message is received by the communications module 122 for the outlet 104 and processed by the processing module 120. In particular, the processing module 120 causes the control module 126 to allow for electrical power to be supplied through the socket 112 (e.g. by toggling the relays 127). The relays 127 may be normally in an "off" configuration (which prevents the flow of electrical power to the socket 112). When the appropriate signals are received from the processing module 120, the relays 127 may be toggled to an "on" configuration, thereby allowing the flow of electrical power to the socket 112. The notification module 148 may also cause appropriate messages to be shown to the user 130, such as through the appropriate illumination of the lights 150 or the display of a message on the screen 152 to indicate that access has been granted.

If the server 102 determines that the user 130 should not be granted access (e.g. due to insufficient funds in the digital wallet 158 or the access plan 156 that is applicable does not allow for access to the outlet 104 at that time), the appropriate refusal message is transmitted to the outlet 104. Upon receipt of the refusal message, the processing module 120 may cause the notification module 14 to display appropriate messages to the user 130, such as through the appropriate illumination of the lights 150 or the display of a message on the screen 152 to indicate that access has been refused.

In another embodiment, the user 130 may, using the computing device 132, access the server 102 through the user interface 136. Instead of using the access unit 142, the user 130 may locate the identification code 146 If the identification code 146 comprises a QR code, the user 130 may scan the identification code 146. This may be done using the computing device 132 (if, for example, the computing device 132 is a smartphone with a camera). Alternatively, if the identification code 146 comprises an alphanumerical identifier, the user 130 may enter the identification code 146 using the user interface 136. In either case, the identification code 146 may be transmitted to the server 102. Based on the identification code 146, the server 102 is able to determine which of the outlets 104 the user 130 is attempting to access. The server 102 will retrieve from the database 128 information regarding the digital wallet 158 for the user 130 and the access plan 156 applicable. As before, the server 102 may make a determination as to whether access to the outlet 104 will be granted. If access is granted by the server 102, the server 102 may also cause to be displayed on the user interface 136 appropriate messages regarding cost and payment. In this embodiment, there are no direct communications between the access unit 142 and the outlet 104. All communications are through the server 102.

Figure 9:
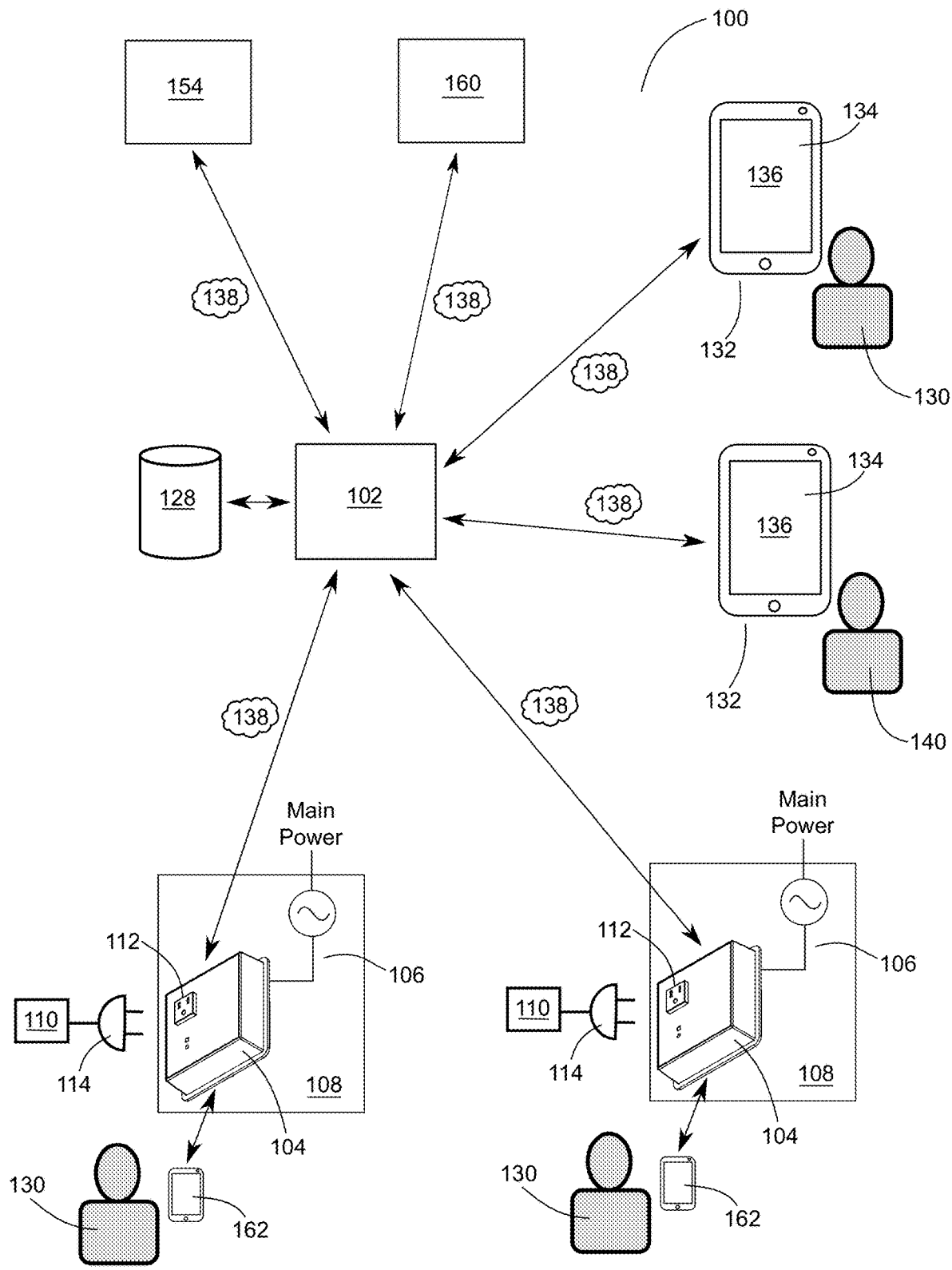
FIG. 9 depicts yet another embodiment of the system.

Referring to FIG. 9, in yet another embodiment, the access unit 142 may be integrated with a mobile device 162, such as a smartphone. In this embodiment, the user 130 may use the mobile device 162 to communicate with the outlet 104. The identification module 144 may be configured to communicate with the mobile device using a communications protocol, such as Bluetooth. The identification module 144 is able to read credentials for the user 130 using such communications. This allows the user 130 to access the outlet 104 without having to carry around the access unit 142

Once access has been granted by the server 102, the user 130 may plug in the device 110 into the socket 112 to receive electrical power. The time during which electrical power is flowing from the socket 112 may be called a "session". The measurement module 124 is able to record various parameters of the electrical power provided through the socket 112 (e.g. voltage, current, power, etc.). This information is sent to the processing module 120, which in turn may periodically transmit it (using the communications module 122) to the server 102. The server 102, based, at least in part, on this information and on information from the access plan 156 applicable, is able to determine the cost incurred during the session thus far. If the server 102 determines that the cost incurred exceeds a certain amount (e.g. the amount remaining in the digital wallet 158 of the user 130 or a certain predetermined amount), the server 102 may transmit a message to the outlet 104 to terminate the session. The processing module 120, upon receipt of the message, may cause the control module 126 to change the relays 127 to the "off" position. In addition, if the device 110 is detected as being unplugged (e.g. the current measured by the measurement module is zero), the processing module 120 will also cause the control module 126 to change the relays 127 to the "off" position. The processing module 120 will also cause a message be sent to the server 102 to advise that the session has been terminated.

Once the session has been terminated, the server 102 is able to determine, based at least in part on the access plan 156 and the information received from the outlet 104 regarding the electrical power consumed, the total cost for the session. This amount may be debited from the digital wallet 158 of the user 130 and credited to the digital wallet 158 of the manager 140 associated with the outlet 104.

Figure 10:
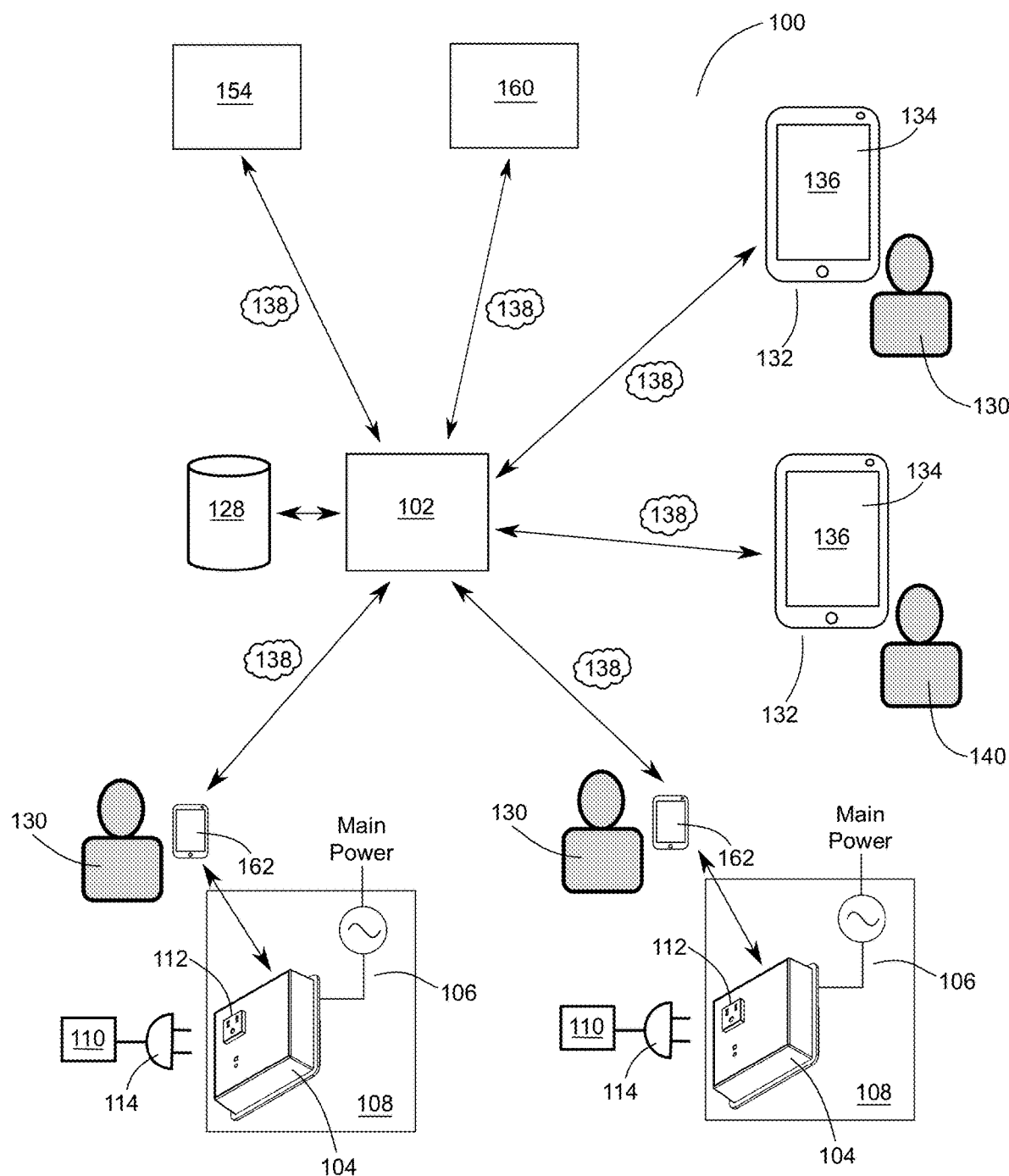
FIG. 10 depicts another embodiment of the system.

Referring to FIG. 10, in another embodiment, the relatively short-range communication between the mobile device 162 and the outlet 104 can free the outlet 104 from the requirement to connect to the server 102 and to transmit power consumption data from the outlet 104 to the server 102 directly. In this asynchronous mode, the access of the user 130 to the outlet 104 is verified beforehand between the sever 102 and the user 130 (such as by using the mobile device 162). The server 102 issues and transmits a token to the mobile device 162, with the token being stored on the mobile device 162. Upon connection between the outlet 104 and the mobile device 162, the token is transmitted to the outlet 104, and the outlet 104 is able to verify the token's signature (using the processing module 120). This verification may provide access to the outlet 104 for the user 130 without requiring a communications connection between the outlet 104 and the server 102. In this embodiment, the information regarding the various parameters of electrical consumption recorded by the measurement module 124 may be transmitted by the outlet 104 to the mobile device 162. The mobile device 162 is configured to transmit this information to the server 102, either at the same time or at a later time. Once the server 102 receives the information, the server 102 is able to determine the cost for the session and process payment accordingly. This embodiment allows for the installation of the outlets 104 in locations with no long-range connectivity with the server 102, with the mobile device 162 acting as an asynchronous mediator.

In addition to the "smart" features of the outlet 104 described above to control access, monitor, measure, and transmit consumption data, the outlet 104 may also be configured (for example, by the managers 140) to disable these features in order to act as a "dumb" outlet that works and behaves like a conventional outlet. This may be referred to as "always on" mode. In addition, the managers 140 may also disable the outlet 104 so that electrical power will not flow (e.g. by using the user interface 136). This may be referred to as "always off" mode.

The outlets 104 may have mechanisms to protect the outlets 104 from tampering and/or abuse (e.g. attempts to connect to the wiring 106 at a point prior to the wiring 106 entering the outlet 104).

Referring to FIG. 7, in order to protect against tampering, the outlet 104 may comprise one or more fasteners 164 for holding the outlet 104 in place on a structure 166. The fasteners 164 may comprise screws or the like. The fasteners 164 also act as a switch in a circuit that is electrically connected to the pins of one or more of the processors 121. If the fasteners 164 are removed or loosened, the associated circuit with connection to the processors 121 (e.g. high-value GPIO) will change connectivity state, akin to toggling a switch to the "off" position. Upon the detection of this change in state, the processing module 120 will cause a message to be sent to the server 102 advising of the possible tampering. The server 102 may alert the manager 140 associated with the outlet 104, such as by sending an email, a text message, or a push notification.

In addition, the outlet 104 may be equipped with a warning module 168. Upon detection by the processing module 120 of possible tampering, the processing module 120 may cause the warning module 168 to generate a warning. The warning module 168 may comprise a siren, a speaker, or some other output device. The warning module 168, upon receipt of a message from the processing module 120 of possible tampering, may cause the siren or the speaker to sound.

The warning module 168 may also be triggered through an analog mechanism without the need for the processing module 120 to determine that possible tampering has occurred.

In another embodiment, to protect against tampering and/or unauthorized access, the socket 112 of the outlet 104 may be decoupled from the other components. For example, the processing module 120, the communications module 122, the measurement module 124, and/or the control module 126 may be further fortified, with only the socket 112 exposed.

Where the communications between the outlet 104 and the server 102 is through Wi-Fi, the Wi-Fi network information and credentials (including SSID and password) need to be communicated to the outlet 104 so that it can establish a connection with the server 102. The connection can be bootstrapped in a number of ways. In one method, the outlet 104 comes with default credentials already entered. The manager 140 is able to set up a Wi-Fi service with the exact credentials and configurations as mandated by the default setup for the outlet 104. The outlet 104 will then connect to the server 102, via the default Wi-Fi network. The manager 140 can then enter the credentials of an alternate Wi-Fi setup into the outlet 104. The manager 140 can then instruct the outlet 104 to connect to the alternate Wi-Fi network. The original network set according to the default Wi-Fi credentials can then be dismantled. Alternatively, the outlet 104, upon not being connected to the server 102, can advertise itself for Bluetooth connection. The manager 140 can then connect to the outlet 104 via Bluetooth (e.g. using the computing device 132) and configure the Wi-Fi credentials.

It will be appreciated by those skilled in the art that the preferred embodiment has been described in some detail but that certain modifications may be practiced without departing from the principles of the invention.

The invention claimed is:

1. A system for tracking and controlling usage of electrical power for charging devices associated with one or more users, the system comprising:
   a server;
   one or more outlets connected to electrical power and configured to supply electrical power to the devices, each of the outlets in communications with the server and comprising:
      a socket configured to supply electrical power to one of the devices;
      a control module for engaging and disengaging electrical power to the socket;
      a measurement module for measuring one or more parameters of electrical power supplied by the socket; and
      an identification code located on the outlet, the identification code being unique to and associated with each of the outlets; and
   one or more computing devices, each of the one or more computing devices associated with one of the users and configured to communicate to the server the identification code associated with one of the outlets and identification of the user associated with the computing device;
wherein the server is configured to, upon receipt from one of the computing devices the identification code and the identification of the user associated with the computing device, determine whether the user is authorized to access the outlet corresponding to the identification code and to, if the user is authorized, communicate an authorization to the outlet corresponding to the identification code;
wherein each of the outlets is further configured to start a session and provide electrical power to the device upon receiving the authorization from the server, each of the outlets further configured to communicate information regarding the one or more parameters to the server regarding the session.

2. The system of claim 1, wherein the control module comprises one or more relays.

3. The system of claim 1, wherein the measurement module comprises one or more gauges, where wherein the one or more gauges are configured to measure one or more of the parameters, the parameters being one or more of current, voltage, or power.

4. The system of claim 1, wherein each of the one or more outlets further comprises a notification module to displaying a status of the outlet to the user.

5. The system of claim 4, wherein the notification module comprises one or more lights.

6. The system of claim 1 further comprising a database in communications with the server, wherein the database comprises one or more access plans associated with each of the users, the access plans comprising information defining one or more rates for electrical power consumption and one or more rules for access to the outlets.

7. The system of claim 6, wherein the server is further configured to determine a cost for the session, the cost determined based on, at least in part, the one or more access plans associated with the user associated with the computing device and the parameters during the session.

8. The system of claim 7, wherein the database further comprises one or more digital wallets, wherein at least one of the digital wallets is associated with one of the users, and wherein the at least one of the digital wallets comprises information regarding funds associated with the user associated with the digital wallet.

9. The system of claim 8, wherein the server is further configured to debit the cost for the session from the digital wallet of the user associated with the computing device.

10. The system of claim 9, wherein at least one of the digital wallets is associated with a third party, and the server is further configured to credit the cost for the session to the digital wallet associated with the third party.

11. The system of claim 7, wherein the server is further configured to communicate with one or more utility companies to receive information regarding electrical rates, the cost for the session being determined based on, at least in part, the information regarding electrical rates.

12. The system of claim 7, wherein the server is further configured to communicate with a payment handler, wherein information regarding the cost for the session is transmitted to the payment handler to arrange for payment.

13. The system of claim 1, wherein the identification code comprises one or both of a QR code and an alphanumerical identifier.

14. The system of claim 1, wherein the server is further configured to generate a user interface for display on the computing devices, the user interface configured to allow users to enter information regarding the identification code and the identification of the user.

15. A system for tracking and controlling usage of electrical power for charging devices associated with one or more users, the system comprising:
  a server;
  one or more outlets connected to electrical power and configured to supply electrical power to the devices, each of the outlets comprising:
    a socket configured to supply electrical power to one of the devices;
    a control module for engaging and disengaging electrical power to the socket;
    a measurement module for measuring one or more parameters of electrical power supplied by the socket; and
    an identification module for verifying credentials for the user; and
  one or more mobile devices configured to wirelessly communicate with the server, each of the mobile devices associated with one of the users and further configured to receive one or more tokens from the server, the tokens comprising credentials for the user associated with the mobile device to allow access to one or more of the outlets;

wherein the mobile devices are further configured to communicate one or more of the tokens to one of the outlets to request authorization to access the outlet;

wherein each of the outlets is configured to verify, based on the one or more tokens received from one of the mobile devices, whether the user associated with the mobile device is authorized to access the outlet, the outlet further configured to start a session and provide electrical power to the device upon verification, the outlet further configured to communicate information regarding the one or more parameters to the mobile device regarding the session.

16. The system of claim 15 further comprising a database in communications with the server, wherein the database comprises one or more access plans associated with each of the users, the access plans comprising information defining one or more rates for electrical power consumption and one or more rules for access to the outlets.

17. The system of claim 16, wherein the server is further configured to determine a cost for the session, the cost determined based on, at least in part, the one or more access plans associated with the user associated with the mobile device and the parameters during the session.

18. The system of claim 17, wherein the database further comprises one or more digital wallets, wherein at least one of the digital wallets is associated with one of the users, and wherein the at least one of the digital wallets comprises information regarding funds associated with the user associated with the digital wallet.

19. The system of claim 18, wherein the server is further configured to debit the cost for the session from the digital wallet of the user associated with the mobile device.

20. The system of claim 19, wherein at least one of the digital wallets is associated with a third party, and the server is further configured to credit the cost for the session to the digital wallet associated with the third party.

* * * * *